(12) United States Patent
Ma

(10) Patent No.: US 11,618,854 B1
(45) Date of Patent: Apr. 4, 2023

(54) METHOD AND SYSTEM FOR REGENERATING OIL FROM MEDICAL WASTE AND WASTE PLASTICS

(71) Applicant: Myung Duck Ma, Los Angeles, CA (US)

(72) Inventor: Myung Duck Ma, Los Angeles, CA (US)

( * ) Notice: Subject to any disclaimer, the term of this patent is extended or adjusted under 35 U.S.C. 154(b) by 0 days.

(21) Appl. No.: 17/516,295

(22) Filed: Nov. 1, 2021

(51) Int. Cl.
| | |
|---|---|
| C10B 53/07 | (2006.01) |
| C10B 47/28 | (2006.01) |
| C10B 23/00 | (2006.01) |
| H05B 3/00 | (2006.01) |
| B01D 3/14 | (2006.01) |

(52) U.S. Cl.
CPC .............. *C10B 53/07* (2013.01); *C10B 47/28* (2013.01); *H05B 3/0038* (2013.01); *B01D 3/14* (2013.01)

(58) Field of Classification Search
None
See application file for complete search history.

(56) References Cited

U.S. PATENT DOCUMENTS

2012/0217149 A1 * 8/2012 Ma .......................... C10L 1/08
202/99

FOREIGN PATENT DOCUMENTS

| WO | WO-2005065006 A2 * | 7/2005 | ............ B01J 19/128 |
| WO | WO-2010003180 A1 * | 1/2010 | ............... B09B 3/00 |

\* cited by examiner

*Primary Examiner* — Philip Y Louie
(74) *Attorney, Agent, or Firm* — Che-Yang Chen; Law Office of Michael Chen

(57) ABSTRACT

A process for converting waste plastic into oil includes: subjecting the waste plastic to be in contact with a plurality of far-infrared ray heating rods in a reactor which contains an agitator configured to distribute the waste plastic; converting the waste plastic into a liquid form resultant decomposition by thermal decomposition and pyrolysis in the reactor; fractionating the resultant decomposition product to obtain gas, light oil, and crude diesel oil; obtaining a sludge from a bottom portion of the reactor and transferring the sludge to a blending tank; transferring the light oil to the blending tank; mixing the sludge and the light oil using a high-speed shearing machine to produce a sludge and light oil mixture; transferring the sludge and light oil mixture to a homogenizer; and blending the sludge and light oil mixture at the homogenizer to form a blended oil.

16 Claims, 5 Drawing Sheets

METHOD AND SYSTEM FOR REGENERATING OIL FROM MEDICAL WASTE AND WASTE PLASTICS

FIELD OF THE DISCLOSURE

The present disclosure relates to a method and system for producing light, heavy, and blended oil from waste plastics and medical waste, and more particularly to a system for mixing the sludge from the plastic pyrolysis with light oil to produce a blended oil product to be a power source for various devices. In particular, the system can be placed on a mobile carrier, such as a truck.

BACKGROUND OF THE DISCLOSURE

Conventional reactors for converting waste plastics into oil, for example, as disclosed in U.S. Pat. No. 5,947,721, 5,951,826 and 5,584,969, typically use high-temperature flue gas to supply the heat required to decompose the plastics into oil. The reactors and processes therein involve some disadvantages. One of the disadvantages is that the heating efficiency of the reactors is not high. During the above-mentioned reactors and processes for converting the plastics into oil, the high-temperature flue gas transfers the heat to the outer surface of the reactor, and then the outer surface conducts the heat to the plastics in the reactor. Because the heat is not directly transferred to the plastics, the heating efficiency is low. Nevertheless, despite the low heat-conducting efficiency, there are serious problems from coking on the inner wall of the reactor. Because the heat-conducting coefficient of typical waste plastic is low, it is difficult to conduct the heat into it from the heat source.

Another one of the disadvantages is that, during the pyrolysis process for waste plastics, some heavy components may form and remain at the bottom of the reactor. After the heavy components cool down, they may form solid sludges which don't have any value. Therefore, it is not cost-effective for reprocessing the solid sludges.

Still another one of the disadvantages is that the heating rods for providing energy to decompose the waste plastic are usually formed as rectangular shapes or columns, and in such a way, coking problems may easily generate during the pyrolysis process.

All referenced patents, applications, and literature are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, a process for converting waste plastic into oil, comprising: subjecting the waste plastic to be in contact with a plurality of far-infrared ray heating rods in the reactor which contains an agitator to distribute the waste plastic; converting the waste plastic into a liquid state decomposition product by thermal decomposition and pyrolysis in the reactor; fractionating the liquid state decomposition product to obtain gas, light oil, and crude diesel oil in the fractionation tower; obtaining a sludge from the reactor and transferring the sludge to a blending tank; transferring the light oil to the blending tank; mixing the sludge and the light oil in the blending tank using a high-speed shearing machine to produce a sludge and light oil mixture; transferring the sludge and light oil mixture to a homogenizer; blending the sludge and light oil mixture at the homogenizer to form a blended oil; and transporting the blended oil to the storage tank.

In another aspect combinable with the general implementation, the far-infrared ray heating rod is shaped like a cone and installed inside the reactor.

In another aspect combinable with the general implementation, the far-infrared ray heating rod comprises a heating core, a casing covered over on the heating core, a heating isolation feeding positioned between the heating core, and a power connector.

In another aspect combinable with the general implementation, the far-infrared ray heating rods are arranged on a top portion of the reactor and extended from the top portion of the reactor to reach the waste plastic.

In another aspect combinable with the general implementation, the waste plastic is polypropylene, polyethylene, polyethylene terephthalate, polystyrene, or a mixture thereof.

In another aspect combinable with the general implementation, the waste plastic comprises polyvinyl chloride in an amount of up to 2% by weight.

In another aspect combinable with the general implementation, the agitator comprises a frame mixer and an anchor mixer operatively connected with the frame mixer through an agitator shaft.

In another aspect combinable with the general implementation, the anchor mixer is located adjacent to a bottom portion of the reactor.

In another aspect combinable with the general implementation, the far-infrared ray heating rod comprises a top end coupled on a top portion of the reactor and a free end configured to be in contact with the waste plastic.

In another aspect combinable with the general implementation, the anchor mixer is a U-shaped mixer and comprises a distal end extended above a free end of the far-infrared ray heating rod.

In another aspect combinable with the general implementation, the far-infrared ray heating rod comprises a free end gradually tapered from a top end of the far-infrared ray heating rod.

In another aspect combinable with the general implementation, the process further comprises: transferring the sludge and light oil mixture to mix with the sludge in the blending tank.

In another aspect combinable with the general implementation, the blended oil comprises the sludge and the light oil in a ratio of 1:1.

In another aspect combinable with the general implementation, the blended oil comprises the sludge and the light oil in a ratio of 1:4.

In another aspect combinable with the general implementation, the blended oil comprises the sludge and the light oil in a ratio of 1:1 to 1:4.

In another aspect combinable with the general implementation, the casing is made of stainless steel.

In another aspect combinable with the general implementation, the far-infrared ray heating rod is located inside an anchor mixer of the agitator.

In another aspect combinable with the general implementation, the reactor, the fractionation tower, and the storage tank are placed on a mobile device.

In another aspect combinable with the general implementation, the process further comprises placing the reactor, the fractionation tower, and the storage tank on a mobile device.

In another aspect combinable with the general implementation, the system for converting the waste plastics into fuel oil is to produce industrial fuel for the industrial refinery and to provide a non-high quality of liquid fuel.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than those described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves. Unless defined otherwise, all technical and position terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

Figure 1:
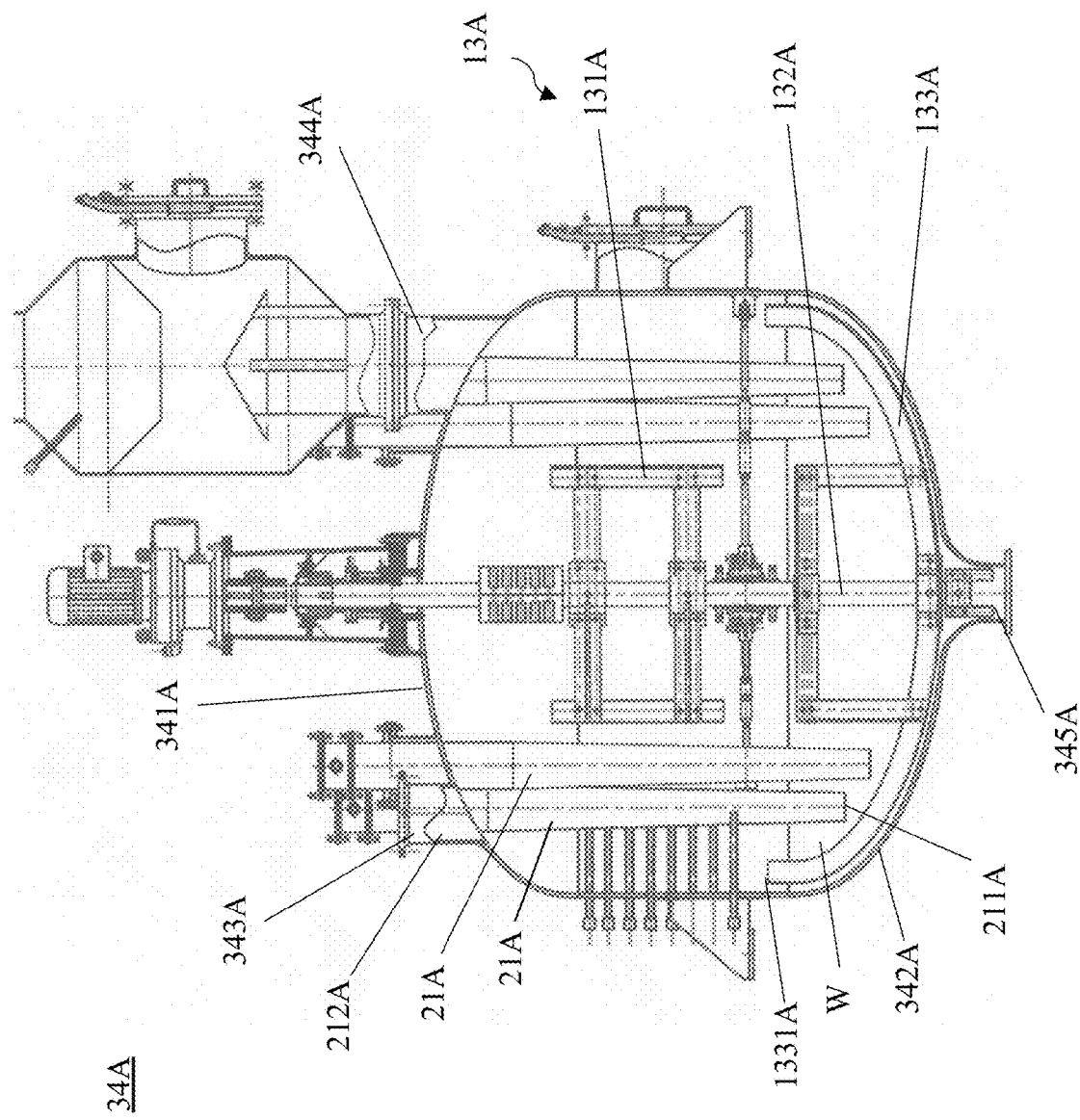
FIG. 1 is an illustrative example of a reactor according to an aspect of the embodiment.

FIG. 1 generally depicts a view of a reactor 34A for converting the waste plastics into oil according to an aspect of the embodiments.

Referring to FIG. 1, the reactor 34A may comprise a plurality of far infrared ray heating rods 21A deposed inside the reactor 34A and an agitator 13A deposed inside the reactor 34A. It should be noted that the waste plastics "W" may be stored inside the reactor 34A where the far-infrared ray heating rods 21A are also placed thereinside.

In some embodiments, the waste plastics "W" may be fed into the reactor 34A through a feeding inlet 343A, then absorb the heat from the far-infrared ray heating rods 21A, and in such a manner, the waste plastics "W" may be melted and decomposed more completely. Therefore, more energy could be saved according to the configuration mentioned above.

In some embodiments, the reactor 34A may be preferably operated under vacuum, in the absence of oxygen.

Figure 2:
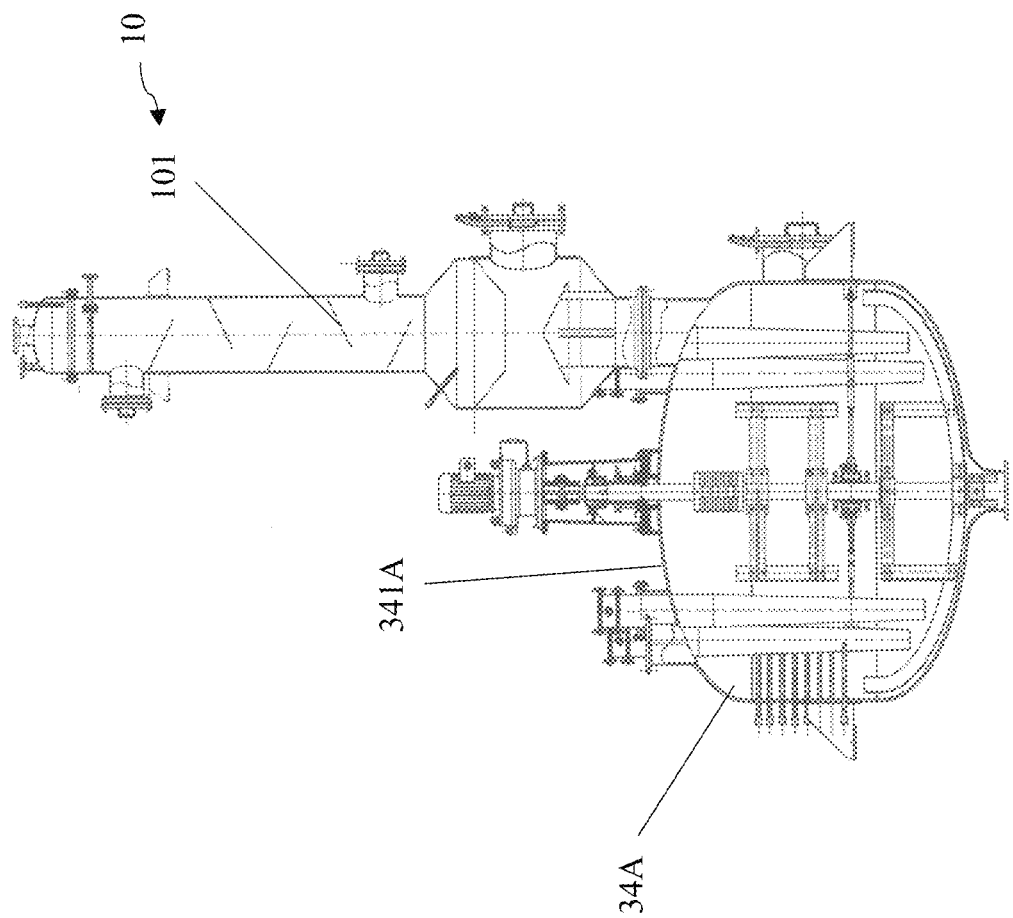
FIG. 2 is an illustrative example of the reactor cooperated with a fractionation tower according to an aspect of the embodiment.

In some embodiments, the reactor 34A may further comprise an agitator 13A. The coke subsides slowly into a bottom portion 342A of the reactor 34A and may be drained out together with the plastics liquor from the reactor 34A through a sludge outlet 345A. This mixture of coke and plastic may be defined as a sludge. The cracked gas from the decomposition of the waste plastic (normally called pyrolysis process) may flow through an oil gas outlet 344A to another unit (e.g., a fractionation tower 10 as shown in FIG. 2).

In some embodiments, the agitator 13A may comprise a frame mixer 131A and an anchor mixer 133A operatively connected with the frame mixer 131A through an agitator shaft 132A. The agitator shaft 132 may be configured to connect the frame mixer 131A and the anchor mixer 133A, and in such a manner, the frame mixer 131A and the anchor mixer 133A may be isolatedly operated. In other words, the frame mixer 131A may be operated to rotate towards a direction and the anchor mixer 133A may be operated to rotate towards an opposite direction. For another example, the frame mixer 131A and the anchor mixer 133A may be operated to rotate towards the same direction.

In some embodiments, the plurality of the far-infrared ray heating rods 21A may be arranged on a top portion 341A of the reactor 34A and extended from the top portion 341A of the reactor 34A to reach the waste plastic. Each of the far-infrared ray heating rods 21A comprises a free end 211A configured to be in contact with the waste plastic and a top end 212A coupled with the top portion 341A of the reactor 34A. It should be noted that the top end 212A of the far-infrared ray heating rod 21A is opposite of the free end 211A of the far-infrared ray heating rod 21A.

For example, the far-infrared ray heating rods 21A may be extended from the top ends 212A to the free ends 211A to allow the free ends to be in contact with the waste plastic. It should be noted that the waste plastic may be stored in a bottom portion 342A of the reactor 34A.

In some embodiments, the anchor mixer 133A may be a U-shaped mixer and may comprise a distal end 1331A extended above the free end 211A of the far-infrared ray heating rod 21A. In some embodiments, the anchor mixer 133A may be located adjacent to the bottom portion 342A of the reactor 34A.

In some embodiments, the distal end 1331A of the anchor mixer 133A may be located below the frame mixer 131A In some embodiments, the far-infrared ray heating rod 21A may be located inside the anchor mixer 133A of the agitator 13A.

In some embodiments, the hot-splitting technique of high-molecular compounds is the course that produces flammable legit oil, thereby breaking the long chains of high molecules and the chains of complex molecules. This produces a part of light oil and meanwhile some cokes from the process. This coke with some heavy pyrolytic product may be discharged as the sludge from the reactor 34A constantly. Both dry and wet methods can be used for the treatment of the sludge. For both methods, discharging of the hot-slitting sludge is performed in a closed system, and this method may guarantee the safety to discharge residuals.

In some embodiments, a process for converting waste plastics into oils, the invention optionally involves further processing into qualified automotive diesel. After the waste plastics are thermally decomposed using far infrared ray heating technology, the vapor products of the decomposition can be fractionated into gas, light oil, and crude diesel oil, and the crude diesel oil can be subjected to ultrasonic desulphurization and solvent-extraction treatments to obtain qualified automobile diesel. The sludge produced from plastic decomposition can be re-cracked to remove the heavy oil components, crushed into pieces, and collected as carbon residual byproducts.

In some embodiments, the waste plastics may be crushed into pieces of the desired size and then loaded into a screw extruder feeding machine. In the presence of high pressure, the waste plastics may be molten in the extruder cylinder at the temperature of about 200-300 degrees C. at the feeding inlet 343A.

In some embodiments, the waste plastics of an appropriate size can be melted directly in the reactor 34A. The far-infrared radiation generated from the far-infrared ray heating rods 21A may be used to provide energy for the thermal cracking of waste plastics. In the reactor 34A, the far infrared ray heating rods 24A are inserted into the reactor 34A from the top portion 341A of the reactor 34A and may emit the far-infrared radiation with the desired wavelength, which can be intensively absorbed by the waste plastic mixture. It should be noted that, according to the above-mentioned configuration, while the far-infrared radiation transports into the melted waste plastic, the melted waste plastic may be heated more evenly and remarkably reduce coking. The waste plastic can be decomposed at a temperature from about 360 degrees C. to 420 degrees C.

In some embodiments, the agitator 13A in the reactor 34A, e.g., which rotates at the rate of approximately 30 rpm, may mix the waste plastic liquor and makes it homogeneous.

After the waste plastics are thermally decomposed using the far-infrared ray heating technology, the vapor products (cracked gas) of the decomposition (pyrolysis process) can be fractionated into gas, light oil, and crude diesel oil, and at the same time, the coke with some heavy pyrolytic product may be discharged as the sludge from the reactor 34A. As noted above, in some embodiments, the disclosed process has a by-product of heavy components which are formed and remained in a bottom portion of the disclosed reactor. When these heavy elements cool down, they form a "sludge." In various embodiments, this sludge is mixed in a homogenizer with small amounts of the useable oil produced by the disclosed process. This results in a blended oil product that is in a liquid state under normal atmospheric and temperature conditions and that can be used in several applications such as fuel for industrial boilers or various other uses.

FIG. 2 generally depicts the reactor 34A cooperated with a fractionation tower 10 according to an aspect of the embodiment.

In some embodiments, the fractionation tower 10 may be affixed on the top portion 341A of the reactor 34A, wherein the fractionation tower 10 may communicate with the reactor 34A. In such a manner, the cracked gas (vapor products of the decomposition from the decomposing plastic as described above) may flow into the fractionation tower 10.

Continuing to FIG. 2, the fractionation tower 10 may be shaped as a cylinder and may comprise a plurality of filtering boards 101 inclinedly arranged on an interior of the fractionation tower 10. It should be noted that the filtering boards 101 may be symmetrically arranged along a central line of the fractionation tower 10. For one example, the filtering boards 101 may be spaced arranged with one another. For another example, each of the filtering boards 101 may be arranged at a different level inside the fractionation tower 10.

Figure 3:
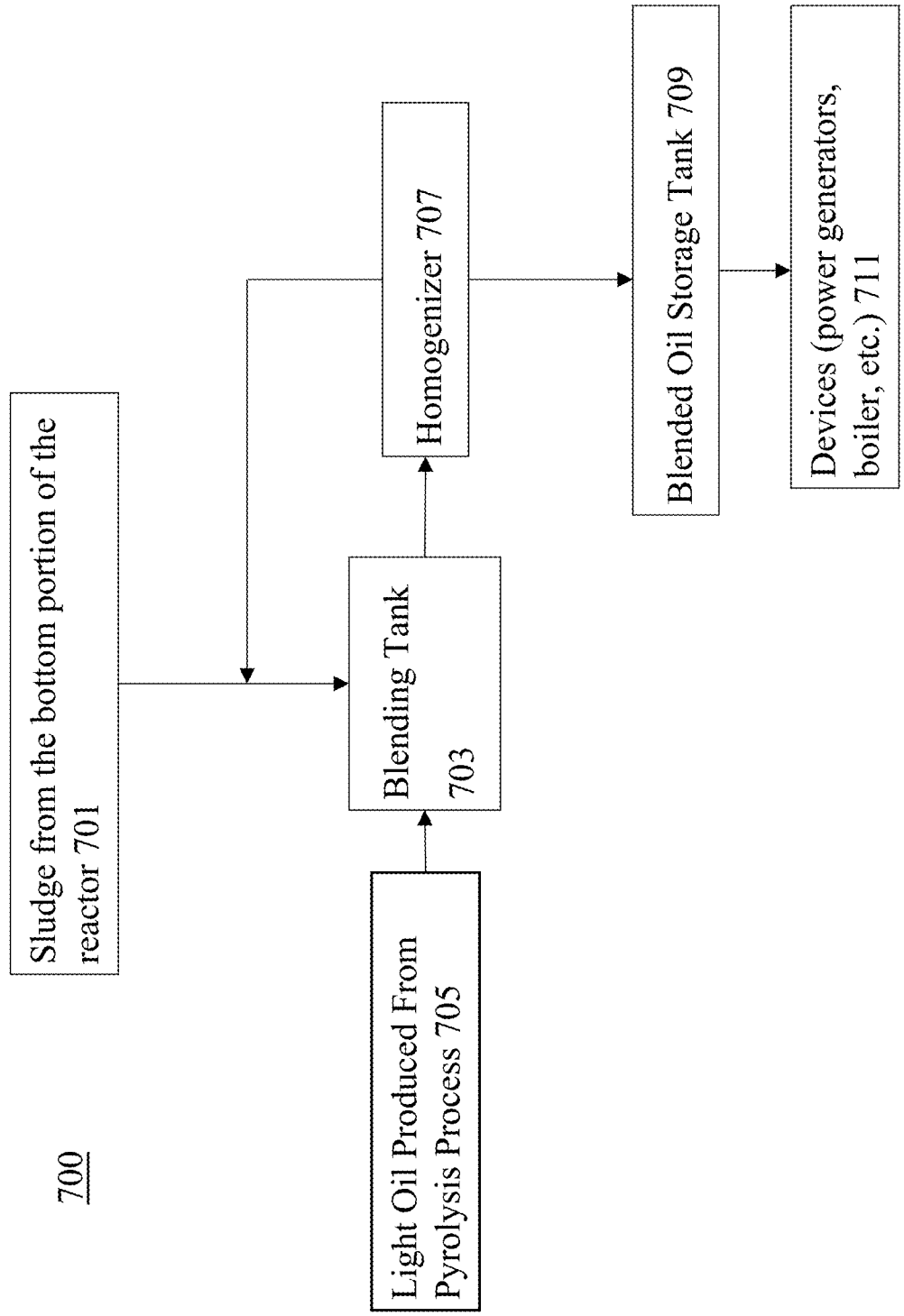
FIG. 3 is a flow chart of an illustrative example of a process involving further processing of the oil from the waste plastic according to an aspect of the embodiment.

From the above descriptions, the filtering boards 101 may be made of filtering materials which could be utilized to filter the vapor products generated from the pyrolysis process happened in the reactor 34A, and in the known manner, the quality of the light oil and crude diesel oil (heavy oil) may be sufficiently improved. FIG. 3 generally depicts a block diagram of an embodiment of a process 700 for creating a blended oil product from by-products of heavy components which are formed and remained in the bottom portion of the disclosed reactor using the methods and systems herein in accordance with one embodiment.

Referring to FIG. 3, the heavy component, i.e., sludge, from the bottom portion of the reactor may be discharged to a blending tank 703. In some embodiments, the light oil generating from the disclosed process for converting waste plastics into oils 705 may be fed into the blending tank 703 and may be mixed with the sludge generated from the reactor 701.

In some embodiments, the sludge and the light oil may be mixed in the blending tank 703 using a high-speed shearing machine. It should be understood that the above-described method for mixing the sludge and the light oil is exemplary and any other method for mixing the sludge and the light oil may be adopted in various embodiments of this disclosure.

In some embodiments, the sludge and the light oil mixture may be sent to a homogenizer 707 where it may be further mixed/blended to form the sludge and light oil mixture. For one example, the sludge and light oil mixture may be cycled back to the blending tank 703 and may be further mixed with the sludge from the bottom portion of the reactor 701 for a predetermined period of times/cycles until a resulting blended oil is achieved.

In some embodiments, the resulting blended oil may be stored in a blended oil storage tank 709. It should be noted that the resulting blended oil stored in the blended oil storage tank 709 may have a 1:1 ratio of the sludge and the light oil mixture. For one example, the resulting blended oil stored in the blended oil storage tank 709 may have a 1:4 ratio of the sludge and the light oil mixture. For another example, the resulting blended oil stored in the blended oil storage tank 709 may have the sludge and the light oil mixture between a ratio of 1:1 to 1:4.

In some embodiments, the resulting blended oil stored in the blended oil storage tank 709 may be delivered to one or more devices 711, such as power generators or boilers. It should be noted that, in some embodiments, the resulting blended oil may be utilized to be a fuel source for the devices.

In some embodiments, the resulting blended oil stored in the blended oil storage tank 709 may be in a liquid state at a normal temperature and atmospheric ranges. In such a manner, the resulting blended oil stored in the blended oil storage tank 709 can be easily and efficiently transported using a readily available mechanism.

Figure 4:
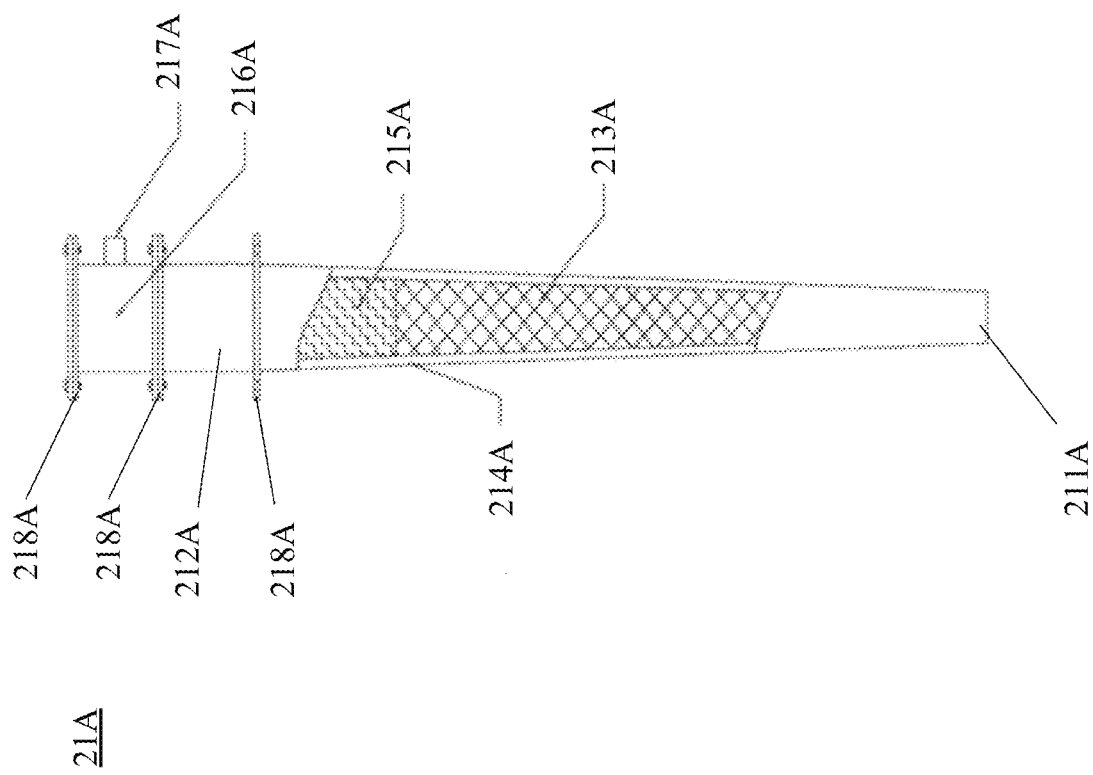
FIG. 4 is an illustrative example of a far-infrared ray heating rod according to an aspect of the embodiment.

FIG. 4 generally depicts a view of the far-infrared ray heating rods 21A according to an aspect of the embodiments.

In some embodiments, the far-infrared ray heating rods 21A may be shaped like a cone and installed inside the reactor 34A, as shown in FIG. 1. The far-infrared heating rod 21A may have the top end 212A coupled on the top portion 341A of the reactor 34A and the free end 211A gradually tapered from the top end 212A to form the cone shape.

In some embodiments, the far-infrared ray heating rod 21A may comprise a heating core 213A, a casing 214A covered over on the heating core 213A, and a heating isolation feeding 215A positioned between the heating core 213A and a power connector 216A. The heating core 213A may be utilized to transfer electricity into the heat and far-infrared radiation, and the power connector 216A may comprise a wire outlet port 217A to electrically communicate with an external power source to provide required electricity to the heating core 213A.

In some embodiments, the casing 214A may be made of stainless steel. The shape of the far-infrared ray heating rod 21A and the material of the casing 214A may prevent the high viscosity material generating from the process for converting the waste plastic into oil to stain on the far-infrared ray heating rod 21A.

In some embodiments, an external AC power may be introduced into the far-infrared ray heating rod 21A to the heating core 213A through the wire outlet port 217A. The casing 214A may be heated by the heating core 213A to reach the temperature of 600 degrees C. or above and may emit far-infrared radiation to heat the object or stream.

As shown further details in FIGS. 1-3, the top end 212A of the far-infrared heating rod 21A may be integrally tapered to the free end 211A of the far-infrared heating rod 21A, and in such a manner, the top end 212A of the far-infrared heating rod 21A may be couped on the top portion 341A of the reactor 34A, and at the same time, the free end 211A of the far-infrared heating rod 21A may be in contact with the waste plastic "W". In such a manner, they may sufficiently reduce the coking problems that may usually generate during the traditional process of waste plastic recycling. The tapered free end 211A of the far-infrared heating rod 21A may prevent the coking that happened on the far-infrared heating rod 21A and facilitate the viscosity materials to fall towards the bottom portion 342A of the reactor 34A. It should be understood that the above-described material of the casing 214A is exemplary and any other material of the casing 214A may be adopted in various embodiments of this disclosure.

From the above descriptions, the far-infrared heating rod 21A may comprise a plurality of sealing flanges 218A sealedly covered on the casing 214A to protect the heating core 213A and the heating isolation feeding 215A in the casing 214A. It should be noted that a thermocouple may be added in the far-infrared heating rod 21A to detect the temperature of the heating core 213A.

Figure 5:
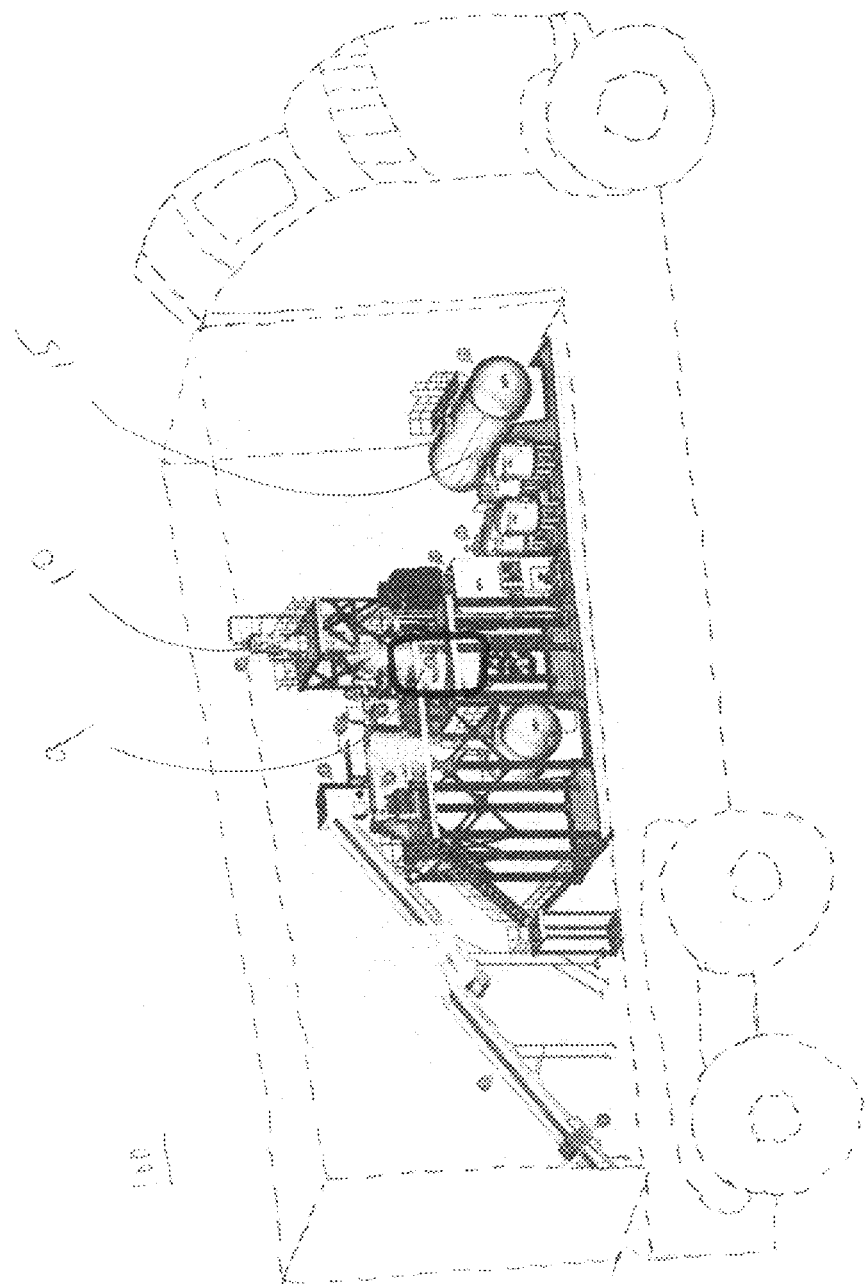
FIG. 5 is a perspective view of a system for converting the waste plastic into oil having the reactor and the fractionation tower of FIG. 2 and showing the system being cooperated on a mobile carrier.

FIG. 5 generally depicts a view of a system 100 having a reactor 9 for converting the waste plastics into oil according to an aspect of the embodiments.

Referring to FIG. 5, the system 100 may comprise the reactor 9 placed on a mobile carrier 40.

In some embodiments, the system 100 may further comprise the fractionation tower 10 communicated with the reactor 9. The reactor 9 as described in FIG. 5 may be the same as the reactor 34A as described in FIG. 1 and FIG. 2. In other words, the gas, light oil, and crude diesel oil generated from the thermal decomposition and pyrolysis may be transported to the fractionation tower 10 to be separated as the gas, the light oil, and the crude diesel oil.

In some embodiments, the system 100 may further comprise a storage tank 15 which may be utilized to store the blended oil as described in FIG. 3 (blended oil storage tank 709).

According to the system 700 as described in FIG. 3, the sludge generated from the reactor 9 may be transported to the system 700 for creating the blended oil products, and the blended oil products may be stored in the storage tank 15.

In some embodiments, the mobile carrier 40 may be a truck or any kind of mobile carrier which could carry and transport the system 100, and in such a manner, the system 100 may be transported to specific locations, such as hospitals or medical facilities, to recycle the medical waste or covid-19 disposals (such as face masks or gloves).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and the following examples, all temperatures are set forth uncorrected in degrees Celsius and, all parts and percentages are by weight unless otherwise indicated.

Example 1

Waste plastic cement bags of polypropylene (thin-type PP) are cut into pieces and the sand sediment removed (298.5/g). They are then put into the cracking reactor and subjected to far IR radiation. The pieces begin to melt and are turning into a liquid state when the temperature of the bottom part of the reactor rises to 110 degrees C. and fuel oil appears at the exit of the condenser behind the reactor when the temperature reaches a specified range and the top temperature is 75 degrees C. After 20 minutes the oil flow increases when the temperature in the bottom increases and the top temperature reaches 95 degrees C. After 10 minutes at this stage, the oil flow accelerates and produces a great quantity of cracking gas, which is ignited after passing through a water-sealed tank. The bottom temperature is increased and the top temperature reaches 242 degrees C. and cracking is carried on for 35 minutes. Ten minutes after this stage, the reaction phase finishes with a top temperature of 147 degrees C. The cracking fuel oil distilled out of the top of the reactor is 196.5/g. The yield of fuel oil is 65.83% from the cement bag and the heavy oil that contains wax at the bottom of the reactor is 62.5/g or 29.93%. The total yield of high-quality fuel oil is 86.76%. Cracking gas and loss amounts to 30.54/g or 10.23% and coke is 8.96/g or 3.01%.

| ACTION | WEIGHT | % |
| --- | --- | --- |
| Fuel oil out of the top of reactor* | 62.5 | 65.83 |
| Heavy oil from the reactor bottom | 62.5 | 20.93 |
| Cracking gas and loss | 54.0 | 10.23 |
| Coke | 8.96 | 3.01 |
| *HQ Fuel oil yield total | 259 | 86.76 |
| Total with debris | 298.5 | 100 |

Example 2

In this experiment, 170.5/g of waste plastic from weaving bags made from polypropylene (PP) are put into the reactor for cracking. The temperature in the bottom of the reactor quickly increases and the top temperature rises to 57 degrees C. The condensed oil begins to flow out of the condenser. After 10 minutes as the bottom temperature climbs and the top temperature reaches 146 degrees C., oil continues to flow and gas is produced and ignited as in example 1. The molten plastic liquid continues to flow and gas is produced and ignited as in example 1. The molten plastic liquid continues to be cracked and as the upper temperature reaches 251 degrees C., fuel oil and gas continue to flow at a rapid pace out of the top of the reactor for 25 minutes. Distillate oil obtained is 118.0/g with a yield of 69.2% while the gas and loss is about 34.0/g or 19.44% and the coke in this run, which also contains oil, is 18.5/g or 10.85%.

| ACTION | WEIGHT | % |
| --- | --- | --- |
| Fuel oil out of the top of reactor* | 118 | 69.2 |
| Cracking gas and loss | 34.0 | 19.44 |
| Coke with oil | 18.5 | 10.85 |
| *HQ Fuel oil yield total | 118 | 69.2 |
| Total with debris | 170.5 | 100 |

Example 3

In this experiment, 47.5/g of waste plastic food bags made from polyethylene (PE) are put into the reactor for cracking. The temperature in the bottom of the reactor is slowly increased to 200 degrees C. and the bags begin to liquefy. The condensed oil begins to flow out of the condenser. As the bottom temperature climbs and the top temperature reaches 180 degrees C. for 15 minutes and is maintained at this temperature for 1 hour, oil is produced. Distillate oil obtained is 42.6/g with a yield of 89.68% while the gas and loss is about 3.4/g or 7.16% and the coke in this run is 1.5/g or 3.16%. No residual heavy oil is obtained in this experiment.

| ACTION | WEIGHT | % |
| --- | --- | --- |
| Fuel oil out of the top of reactor* | 42.6 | 89.68 |
| Cracking gas and loss | 3.4 | 7.16 |
| Coke | 1.5 | 3.16 |
| *HQ Fuel oil yield total | 42.6 | 89.68 |
| Total with debris | 47.5 | 100 |

Example 4

In this experiment, 314.9/g of waste plastic from a white plastic barrel is put into the reactor for cracking. The reactor is heated for 25 minutes at which time a white gas-like fog flows out of the reactor. The bottom temperature climbs to 208 degrees C. and the top temperature reaches 56 degrees C.; the plastic is fully liquefied at 330 degrees C. at the bottom side of the reactor. The molten plastic liquid continues to be cracked and as the upper temperature reaches 120 degrees C. and fuel oil and gas continue to flow at a rapid pace out of the top of the reactor for 20 minutes at which time the cracking reaction finished. Distillate oil containing wax is 207.5/g with a yield of 66.0% and the residual oil is 87.5/g or 27.8%.

Example 5

In this experiment, 36.5/g of plastic foam lining made from polystyrene (PSF) is put into the reactor for cracking. The pieces begin to melt and are turning into a liquid state when the temperature of the bottom part of the reactor increases and fuel oil appears at the exit of the condenser behind the reactor when the temperature reaches a specified range and the top temperature is 85 degrees C. The cracking reaction is maintained at a higher temperature in the bottom with the top temperature reaching 248 degrees C. for 44 minutes. The first distillate oil obtained is milky white with some clouding and finally a transparent yellow. The distillate oil is 24.2/g with a yield of 66.3% while the residual oil is 4.5/g or 12.3% in this experiment. Overall, a total yield of 78.6% was attained.

Many alterations and modifications may be made by those having ordinary skill in the art without departing from the spirit and scope of the disclosed embodiments. Therefore, it must be understood that the illustrated embodiments have been set forth only for example and that it should not be taken as limiting the embodiments as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Thus, specific embodiments and applications of a method of and system for producing light, heavy, and blended oil from waste plastic have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. A process for converting waste plastic into oil, comprising:
   contacting the waste plastic with a plurality of far-infrared ray heating rods in a reactor which contains an agitator to distribute the waste plastic;
   converting the waste plastic into a decomposition product by thermal decomposition and pyrolysis in the reactor;
   fractionating the decomposition product to obtain gas, light oil, and crude diesel oil in a fractionation tower;
   obtaining a sludge from the reactor and transferring the sludge to a blending tank;
   transferring the light oil to the blending tank;
   mixing the sludge and the light oil in the blending tank using a high-speed shearing machine to produce a sludge and light oil mixture;
   transferring the sludge and light oil mixture to a homogenizer;
   blending the sludge and light oil mixture in the homogenizer to form a blended oil; and
   transporting the blended oil to a storage tank.

2. The process of claim 1, wherein each of the far-infrared ray heating rods in the plurality of far-infrared ray heating rods are shaped as a cone and installed inside the reactor.

3. The process of claim 1, wherein each of the far-infrared ray heating rods in the plurality of far-infrared ray heating rods comprise a heating core, a casing covering the heating core, and a heating isolation feeding positioned between the heating core and a power connector.

4. The process of claim 1, wherein the far-infrared ray heating rods are coupled on a top portion of the reactor and extended from the top portion of the reactor to reach the waste plastic.

5. The process of claim 1, wherein the agitator comprises a frame mixer and an anchor mixer operatively connected with the frame mixer through an agitator shaft.

6. The process of claim 5, wherein the anchor mixer is located adjacent to a bottom portion of the reactor.

7. The process of claim 1, wherein each of the far-infrared ray heating rods in the plurality of far-infrared ray heating rods comprise a top end coupled on a top portion of the reactor and a free end configured to be in contact with the waste plastic.

8. The process of claim 5, wherein the anchor mixer is a U-shaped mixer and comprises a distal end extended above a free end of each of the far-infrared ray heating rods in the plurality of far-infrared ray heating rods.

9. The process of claim 1, wherein each of the far-infrared ray heating rods in the plurality of far-infrared ray heating rods comprise a top end gradually tapered and extended to form a free end configured to be in contact with the waste plastic.

10. The process of claim 1, wherein the blended oil comprises the sludge and the light oil in a weight ratio of 1:1.

11. The process of claim 1, wherein the blended oil comprises the sludge and the light oil in a weight ratio of 1:4.

12. The process of claim 1, wherein the blended oil comprises the sludge and the light oil in a weight ratio of 1:1 to 1:4.

13. The process of claim 3, wherein the casing is made of stainless steel.

14. The process of claim 1, wherein each of the far-infrared ray heating rods in the plurality of far-infrared ray heating rods are located inside an anchor mixer of the agitator.

15. The process of claim 1, wherein the reactor, the fractionation tower, and the storage tank are placed on a mobile carrier.

16. The process of claim 1, further comprising placing the reactor, the fractionation tower, and the storage tank on a mobile carrier.

* * * * *